United States Patent
Weber et al.

(10) Patent No.: US 11,701,747 B2
(45) Date of Patent: Jul. 18, 2023

(54) INSPECTION OF A TOOL OF A MACHINE TOOL

(71) Applicant: SICK AG, Waldkirch (DE)

(72) Inventors: Thomas Weber, Waldkirch (DE); Kim Fritz, Waldkirch (DE); Gerald Krumm, Waldkirch (DE); Robert Schröder, Waldkirch (DE)

(73) Assignee: SICK AG, Waldkirch (DE)

( * ) Notice: Subject to any disclaimer, the term of this patent is extended or adjusted under 35 U.S.C. 154(b) by 7 days.

(21) Appl. No.: 17/405,472

(22) Filed: Aug. 18, 2021

(65) Prior Publication Data

US 2022/0072674 A1 Mar. 10, 2022

(30) Foreign Application Priority Data

Sep. 7, 2020 (EP) ...................................... 20194899

(51) Int. Cl.
*B23Q 17/24* (2006.01)
*G01S 13/08* (2006.01)
*G01S 13/88* (2006.01)
*B23Q 17/09* (2006.01)

(52) U.S. Cl.
CPC ..... *B23Q 17/2461* (2013.01); *B23Q 17/2485* (2013.01); *G01S 13/08* (2013.01); *G01S 13/88* (2013.01); *B23Q 17/0914* (2013.01)

(58) Field of Classification Search
CPC ............ B23Q 17/2461; B23Q 17/2485; B23Q 17/0914; G01S 13/08; G01S 13/88
See application file for complete search history.

(56) References Cited

U.S. PATENT DOCUMENTS 8,259,004 B2 * 9/2012 Bonerz ................ B23Q 17/003
408/239 R
10,406,670 B2 * 9/2019 Roehm .................... B25F 5/02
(Continued)

FOREIGN PATENT DOCUMENTS

DE 102012111723 B3 * 5/2014 ......... B23Q 17/0914
DE 102012111723 B3 5/2014
(Continued)

OTHER PUBLICATIONS

17405472_2023-03-07_DE_102012111723_B3_M.pdf—Machine translation of DE-102012111723-B3 (Year: 2014).*
(Continued)

*Primary Examiner* — Erin F Heard
*Assistant Examiner* — Kenneth W Good
(74) *Attorney, Agent, or Firm* — Nath, Goldberg & Meyer; Jerald L. Meyer (57) ABSTRACT

A sensor (10) for inspecting a tool (28) of a machine tool (24) is provided that has a radio frequency transmitter (12) for generating a radio frequency signal, a radio frequency receiver (14) for generating a received signal from a received radio frequency signal, a coupling unit (16) to couple a radio frequency signal into the tool (28) and to decouple it from the tool (28), and a control and evaluation unit (20) to determine a time of flight of a radio frequency signal transmitted from the radio frequency transmitter (12) and received again by the radio frequency receiver (14) with reference to the received signal of the radio frequency receiver (14).

20 Claims, 3 Drawing Sheets

(56) References Cited

U.S. PATENT DOCUMENTS

| | | | | |
|---|---|---|---|---|
| 2008/0013403 A1* | 1/2008 | Camwell | ............... | E21B 47/16 |
| | | | | 367/82 |
| 2012/0212366 A1* | 8/2012 | Alalusi | ................... | G01S 7/03 |
| | | | | 342/118 |
| 2016/0225495 A1* | 8/2016 | Kugler | ..................... | B25F 5/02 |
| 2016/0305232 A1* | 10/2016 | Bird | .................... | E21B 47/001 |
| 2016/0363663 A1* | 12/2016 | Mindell | ................ | G01S 7/003 |
| 2020/0063402 A1* | 2/2020 | Leslie | ................... | E02F 9/267 |

FOREIGN PATENT DOCUMENTS

| | | | | |
|---|---|---|---|---|
| DE | 102014109399 A1 | 1/2016 | | |
| EP | 2915627 B1 | 8/2016 | | |
| EP | 3719307 A1 * | 10/2020 | ............ | F03D 17/00 |
| GB | 2405479 A | 3/2005 | | |
| JP | H03294150 A | 12/1991 | | |

OTHER PUBLICATIONS

European Search Report dated Feb. 19, 2021 corresponding to application No. 20194899.9-1016.

\* cited by examiner

INSPECTION OF A TOOL OF A MACHINE TOOL

BACKGROUND

Technical Field

The invention relates to a sensor and to a method for inspecting a tool head of a machine tool.

Background Art

Examples of such machine tools are cutting machining tools such as lathes and milling machines in which a drill is frequently clamped as the tool as a tool head or tool portion. A change, above all a defect, is automatically recognized by the inspection of the machine.

It is known to recognize breakage or damage to a drill using tactile or optical sensors. The measuring station is traveled to separately for the inspection procedure. The arm that has worked with the tool head consequently has to first travel to the measuring station after every workstep to carry out the measurement at the tool head before it can return to its starting position. This additional process step has negative effects on the cycle time of the machine. In addition, every sensor setup including a measurement zone requires space within the machining area of the machine. This space is, however, very restricted, on the one hand, and should, on the other hand, remain as useful space reserved for the workpiece to be machined.

Optical inspection systems work under heavy-duty environmental conditions. There are chip deposits at the boring head and equally at the workpiece and remainders of coolants and lubricants as residue at the drill or distributed within the machining cell by the drill and the pressure of the application. These problems have a direct effect on the measurement accuracy and on the reliability of the optical measurement.

EP 2 915 627 B1 discloses a light grid for a tool inspection. To enable a particularly fast inspection of the tool, the beams of the light grid can be individually activated and are thus adaptable to the specific check. However, this does not yet overcome said disadvantages of an optical inspection system.

A further approach for the inspection of a tool measures the energy consumption of the drive. It is, however, difficult to put the energy consumption into an unambiguous relationship with the state of the tool. The energy consumption additionally varies greatly during the machining even if the tool is not changed.

The TDR (time domain reflectometry) measurement principle is known from completely different applications than the inspection of a tool. One of the oldest applications of the TDR principle is the localization of breaks in transoceanic cables. A further conventional field of use is the determination of filling levels. The TDR principle is based on the determination of times of flight of an electromagnetic pulse for the determination of the distance of a discontinuity of the loss resistance such as a cable break or a product boundary surface. It is thus similar to radar, with the difference being that the electromagnetic waves are not irradiated into the open, but are rather conducted along a conductor.

SUMMARY

Against this background, it is the object of the invention to provide an improved inspection of a tool.

This object is satisfied by a sensor and by a method of inspecting a tool head of a machine tool. The machine tool can preferably be one of the cutting machining tools named in the introduction, in particular a CNC machine. A robot arm having a tool, a DIY machine such as a drill or a cordless screwdriver and generally a machine having a tool can also be understood as a machine tool. It should primarily be determined by the inspection of the tool whether a tool is damaged or is still suitable for machining a workpiece. This in particular relates to a tool break. A different inspection can, however, also be made, for whether the correct tool has been clamped in and whether it is correctly clamped in.

The invention starts from the basic idea of inspecting the tool with reference to the time of flight of a radio frequency signal running in the tool. A radio frequency pulse that can also be a multiple pulse or another pattern is in particular used in accordance with the TDR measurement principle for this purpose. The sensor has a radio frequency transmitter and a radio frequency receiver to transmit the radio frequency signal and to receive it again. The radio frequency transmitter and the radio frequency receiver can together be formed as a transceiver. A coupling unit of the sensor couples the radio frequency signal into the tool and decouples the returning radio frequency signal from the tool. The coupling can be indirect in dependence on the embodiment, that is can first take place in other elements such as a tool mount. The radio frequency signal runs from the radio frequency transmitter to the coupling point, in the tool to the tool tip, back to the coupling point, and then to the radio frequency receiver. The time of flight measured in this process can be purged of constant components such as the signal paths from the radio frequency transmitter to the coupling point and from the coupling point to the radio frequency receiver and from a portion of the tool length from the coupling point to a tool base in the opposite direction to the tool tip, for example by calibration. Depending on the embodiment, further signal portions do not run to the tool tip and back, but rather to the base of the tool and possibly into further machine parts. They are interference portions; the time of flight to be evaluated is that to the tool tip.

It is addressed in this description and in the claims that the radio frequency signal is coupled into the tool or runs in the tool. The radio frequency signal actually does not necessarily penetrate into the tool, but is rather a radio frequency wave at the surface having a penetration depth that can inter alia depend on the frequency and on the tool material. These linguistic and technical fine details should not be important; a radio frequency signal "on" the tool or "in an upper layer of the tool" should equally be meant.

The invention has the advantage that the initially named disadvantages are overcome. The measurement principle in accordance with the invention is considerably more robust against typical interference due to contaminants in the environment of a machine tool than an optical detection. Since no separate measurement station is required, the space requirement therefor is dispensed with. The sensor can inspect the tool during the normal working routine and the cycle time of the machine tool is thus not impaired. The measurement for the inspection can take place, for example, on the travel path between two machining points. A measurement is also conceivable during the machining itself. Reflections are evaluated in this process that occur when the radio frequency signal propagates along the tool and an impedance change is produced at the point at which the tool penetrates into the workpiece. The presence of the workpiece can thus be checked and it can be at least roughly determined even in the sense of a quality check or routine check how far the tool has already penetrated into the workpiece.

The sensor preferably has an output for outputting length information of the tool acquired from the time of flight and/or a display for displaying length information of the tool acquired from the time of flight. The result of the measurement for the inspection of the tool is thus available externally for a higher ranking control or a user.

The control and evaluation unit is preferably configured to compare the measured time of flight with an expected time of flight of an expected tool and in particular to output or display a result of the comparison. In this embodiment, the sensor itself knows the expectations on the tool and can output a test result instead of or in addition to simply the time of flight information. The expectation can relate to a type of the tool and preferably to an intact tool. The comparison can take place on the level of the times of flight themselves or on a value derived therefrom such as the tool length. The test result can be binary, for instance an O.K. or defect/maintenance information. It is conceivable to output a stop signal to the machine tool so that it is stopped or does not start at all with an incorrect or defective tool.

The tool preferably has a rotating tool, in particular a drill. This is a very frequent application for a machine tool.

The coupling unit preferably has a coupling piece that at least partly surrounds the periphery of the tool and/or of a tool mount of the tool. It is here in particular an annular or partially annular coupling piece. This shape of the coupling piece is particularly suitable for the coupling into a rotating tool.

The coupling unit is preferably configured to couple the radio frequency signal directly into the tool. The sensor thus comes directly into coupling contact with the tool. A conductive, inductive, or capacitive coupling is conceivable here. A retrofitting of the sensor into existing machine tools is particularly simple with this form of the coupling. Statements have already been made above on the question whether the radio frequency signal couples into the tool or not rather only onto its surface.

The coupling unit is preferably configured to couple the radio frequency signal into a tool mount of the tool or into a shaft of the machine tool. In this embodiment, the coupling takes place into the tool only indirectly via the tool mount. The radio frequency signal then runs from the tool mount on into the tool. With a rotating tool such as a drill, the tool mount is connected to the shaft and likewise rotates.

The control and evaluation unit is preferably configured to take account of a previously recorded reference signal, in particular a reference signal that was recorded for an expected tool, in the determination of the time of flight. The expected tool is in turn in particular the correct tool that is correctly clamped in and that is intact and thus serviceable. The reference signal is stored, for example, in advance in a memory of the control and evaluation unit. At least the major interference influences are known with reference to the reference signal. They include impedance jumps in the transition between a free tool part and a tool part held by the tool mount, other influences by the machine parts surrounding the tool, and an echo from the tool base, for example, in addition to the useful echo from the tool tip. To take account of the reference signal and thus these interference influences, the reference signal can, for example, be deducted from the received signal before the time of flight evaluation. The reference signal can also be preprocessed, for example a useful echo from the tool tip can be removed therefrom since otherwise the sought measurement effect would possibly also be attenuated by difference formation in operation.

In an advantageous further development, a machine tool is provided with a tool and with a sensor in accordance with the invention for the inspection of the tool. The possible characteristics of the machine tool were already discussed above. The sensor is preferably mounted at the machine, but its coupling unit is at least attached to the tool with at least indirect coupling contact so that the radio frequency signal enters into the tool and exits the tool again.

The machine tool preferably has an insulation between the tool and a tool mount of the tool. In this embodiment, the coupling unit couples directly to the tool since the radio frequency signal would not move from the tool mount into the tool against the insulation. The tool forms the inner conductor, the tool mount, and further parts of the machine form the outer conductor of a coaxial conductor corresponding to a probe of a TDR sensor. The insulation, tool, and the sensor could be retrofitted in this embodiment.

The machine tool preferably has an insulation around a tool mount of the tool with respect to the remaining machine tool. In this embodiment, the coupling unit only couples to the tool indirectly via the tool mount. The requirement is accordingly that the tool mount establishes a conductive connection to the tool, which is, however, anyway the case for conventional tool mounts. A coaxial conductor is here implemented with the tool mount and in its extension with the tool as an inner conductor and with the remaining machine as an outer conductor.

The method in accordance with the invention is preferably carried out using a sensor in accordance with the invention. A radio frequency signal is coupled in at a coupling point and is decoupled from the tool, with the radio frequency signal running between the coupling and the decoupling to a tool tip of the tool and back and the time of flight of the radio frequency signal up to the tool tip is determined.

The determination of the time of flight is preferably carried out during the regular work routine of the machine tool. It is accordingly not necessary that the tool adopts a specific position or a specific operating state to be able to be inspected, it in particular does not have to be expressly moved into a measurement station.

The determination of the time of flight preferably takes place in specific work phases. Even if the tool does not have to be brought into a state suitable for the inspection, it is nevertheless advantageous to use specific work phases of the anyway provided work routine of the machine tool for the inspection. Such a work phase is when the tool is not in the proximity of a workpiece, but rather as free as possible in space so that there are hardly any external influences on the measurement. It can, however, also conversely be advantageous to select work phases in which the environment has specific influences on the measurement. They are then where possible highly defined influences or even influences that even support the inspection of the tool. It is conceivable to record a reference signal for this known environment beforehand and to take it into account in the determination of the time of flight.

The determination of the time of flight preferably takes place in a work phase in which the tool comes into contact with a work means, is in particular dipped into a work means or is admixed therewith. This is a special case of a work phase with a specific environment of the tool. The work means can, for example, machine or regrind the tool or can be an article to be taken up by the tool such as a screw. The work means is particularly preferably a coolant or a lubricant. Such a work means changes the dielectric constant around the tool. The corresponding impedance changes along the propagation path of the radio frequency signal at the tool allow additional echoes to be expected and additionally the changed dielectric properties of the environment, overall allow a delay of the radio frequency signal and thus an extension of the time of flight to be expected. It can thus be checked whether the tool is wetted or is going to be wetted at the provided points with coolant or lubricant. Another sensor system for the monitoring of the flows of coolant or lubricant can thus possibly be dispensed with or a check can be made whether the coolant or lubricant is sprayed at the correct point.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
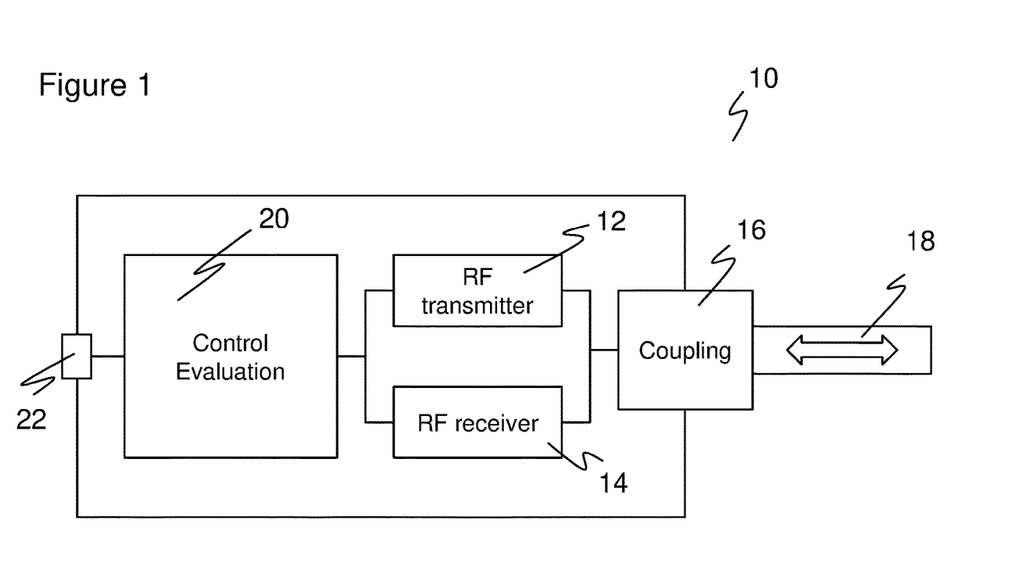
FIG. 1 a block diagram of a sensor for tool inspection.

FIG. 1 shows a block diagram of a sensor 10 for tool inspection. The sensor 10 has a radio frequency transmitter 12 and a radio frequency receiver 14 that can also be configured together as a transceiver. The radio frequency transmitter 12 and the radio frequency receiver 14 are connected to a coupling unit 16 to transmit a radio frequency signal to the measurement path 18 only shown schematically here and to receive it from there. A control and evaluation unit 20 generates radio frequency signals, in particular radio frequency pulses, via the radio frequency transmitter 12, which radio frequency signals are converted by the radio frequency receiver 14 into a received signal and then evaluated after their path over the measurement path 18.

The control and evaluation unit 20 measures the time of flight of the radio frequency signal in this manner and thus the length of the measurement path 18 corresponding to the principle known per se of the time domain reflectometry or of the TDR measurement principle. Evaluation steps are conceivable here to purge the detected time of flight, for instance from internal signal times of flight, and to deal with interference or signal pulses of the received signal that do not come, as desired, from the provided end of the measurement path 18. For this purpose, for example, a reference signal is recorded in advance in a known environment and is taken into account in the evaluation, in particular by a difference formation with the respective received signal.

The time of flight or a value derived therefrom can be output at an output 22 and/or can be displayed on a display. The function of the sensor 10 is the inspection of a tool when, that is, the measurement path 18 is at least partly a signal path within a tool. The evaluation can in this case go a step further and check whether the time of flight or a value derived therefrom such as the tool length corresponds to an expectation. The result of this check is then output at the output 22 or on the display instead or beside the time of flight. It is preferably a binary result that indicates whether the inspection has shown a defect of the tool or another possible error situation such as an incorrect clamped tool or an incorrectly clamped tool. In a preferred embodiment, an inspection that has recognized the tool as not in order directly acts on a control of the machine tool and stops or rejects its operation.

A challenge for the sensor 10 is the coupling in and decoupling of the radio frequency signal into the tool or from the tool respectively. This will be explained in the following with reference to FIGS. 2-5 in addition to further advantageous embodiments of the invention.

Figure 2:
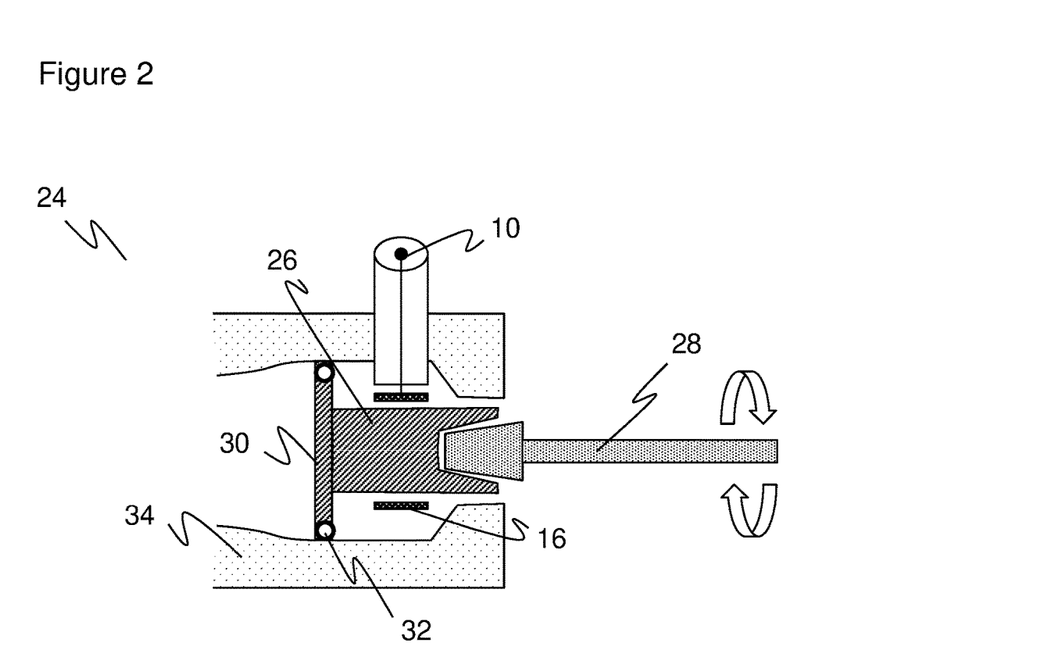
FIG. 2 a sectional representation of a tool mount with a tool of a machine tool with a coupled sensor for the tool inspection.

FIG. 2 shows a very simplified sectional representation of a detail of a machine tool 24 having a tool mount 26 in which a tool 28 is clamped. Otherwise only a shaft 30 with a support 32, by which the tool mount 26 and thus also the clamped tool 28 rotates, as well as a small section of a housing 34 are shown of the machine tool 24. The remaining complexity of a machine tool 24 is not shown since the innumerable variation options in this regard do not contribute to the understanding of the invention.

The coupling unit 16 of the sensor 10 couples at the tool mount 26. A coaxial conductor is indicated in FIG. 2 whose inner conductor forms the tool mount 26 and in whose extension the tool 28 and its outer conductor forms the remaining machine such as the housing 34. The transition to the sensor 10 shown by way of example in FIG. 1 is indicated only purely functionally by reference numeral 10. The sensor 10 can physically actually be mounted at the machine tool 24, but can also be located elsewhere. The tool mount 26 and the tool 28 of FIG. 2 form the measurement path 18 of FIG. 1. The fixed time of flight portion of flight paths of the radio frequency signal through the coupling unit 16 and the tool mount 26 can be eliminated by calibration or another evaluation to obtain the pure time of flight through the tool 28.

The tool inspection in accordance with the invention will now be further explained with reference to a sensor 10 in accordance with FIG. 1 coupled by way of example at least indirectly to the tool 28 as in FIG. 2. A break of the clamped tool 28 is here spoken of purely by way of example. The check works in a very analogous manner even when it is a question of different inspections than that on the correct tool 28 or its correct position and connection to and in the tool mount 26.

A length change and thus a change in the measured time of flight of the radio frequency signal occurs due to the break of the clamped tool 28. This measurement information can be forwarded as the time of flight, time of flight change, length, length change, or other derived value and preferably in the form of a binary report of the content "in order" or "defective" that is one binary state for a check without abnormality and the other binary state for a check with abnormality.

To implement this, a radio frequency signal is conducted from the sensor 10 into the tool mount 26 that is reflected at the remote tip of the tool 28. The tool mount 26 and the tool 28 here act so-to-say as inner conductors of a coaxial line. The reflected radio frequency signal is decoupled, detected in the sensor 10, converted into a received signal, and the received signal is further evaluated. The time of flight measured here becomes shorter on a break of the tool 28. This can then be output as a damage report or as a time of flight change.

The coupling between the coupling unit 16 and the tool mount 26 is preferably implemented with an annular arrangement or at least with a ring segment that has a sufficient coupling suitable for radio frequency between the ring and the rotating tool mount 26. The coupling can here take place conductively, inductively, or capacitively depending on the embodiment. The coupling should additionally take place in a protected region in which, where possible, no chips, process fluids, or other interfering materials occur due to the machining.

The radio frequency signal will inevitably also propagate in other directions than only to the tip of the tool 28. Some of the radio frequency signal runs in the opposite direction to the shaft 30. The support 32 of the shaft 30 can there form a short circuit with total reflection or the shaft 30 has a greater extent than in FIG. 2 and passes through different surrounding materials with impedance jumps that trigger intermediate echoes. Such unwanted reflections also occur on the way of the radio frequency signal through the tool 28, for instance at the exit of the tool 28 from the surrounding machine.

The received signal does not only have the useful signal from the tip of the tool 28 due to such and further interference influences. Since, however, the other reflection points are at least constant over a certain operating time, processes for the masking of static interference points can be used. A received signal is preferably recorded and stored as a reference signal in a reference situation for example directly after the clamping of a tool 28 that was inspected by a skilled person as the correct tool 28, as intact, and as correctly clamped. The skilled person can also be dispensed with if it is simply assumed that the tool 28 is in order at the start of the machining. In later measurements with the tool 28, the reference signal is taken into account, for example a corrected received signal is produced and further processed from the respective received signal by difference formation with the reference signal. The influence of static interference sites is eliminated in this manner or at least reduced.

In a preferred embodiment, a radio frequency pulse is transmitted and the temporal length of a useful echo from the tip of the tool is determined with reference to its center of gravity or by the evaluation of a flank. The interference influences can introduce further echoes that are superposed on the useful echo or make its identification more difficult. The influence of interference echoes can be reduced, as described, by a reference signal. In addition, the coupling can preferably be implemented such that interference echoes and the useful echo are separated in time from one another.

Whether the tool 28 has been correctly clamped or whether it is the correct tool can already be determined by a time of flight measurement on the clamping and first-time measurement of a tool 28 provided that the sensor 10 knows a corresponding expectation on the time of flight. It is not possible to unambiguously distinguish any desired tools 28 since, for example, the diameter has no influence or as good as no influence on the time of flight. As part of the measurement resolution, however, a large number of errors with respect to an incorrect tool 28 or an incorrectly clamped tool 28 are recognized with reference to the time of flight to improve the reliability of the machine tool 24.

An advantage of the invention comprises the inspection of the tool 28 being able to be integrated in the normal work routine of the machine tool 24. It is not necessary to move the tool 28 into a special position expressly for the inspection or, as customary, to a separate measurement station. Specific work phases of the normal work routine are nevertheless preferably used for the inspection. If, for example, the tool 28 is in the proximity of a metal environment of the machine tool 24, this can be utilized to shield radio frequency influences from the environment in which a measurement is made if the tool 28 is in a favorable position with respect to the metal environment. It is conceivable to use a work phase for the inspection in which any objects have a distance from the tool 28 that is as large as possible.

It is customary with a machine tool 24 to bring the tool 28 together with the tool mount 26 into contact with a liquid, preferably oil, over and over again or to immerse it in it. The tool 28 is thus provided with coolant or lubricant. The liquid substantially slows the propagation speed of the radio frequency signal. This, on the one hand, permits an improved measurement with smaller time demands. A further inspection is moreover immediately conceivable, namely whether the tool 28 is, as intended, admixed with coolant or lubricant.

Figure 3:
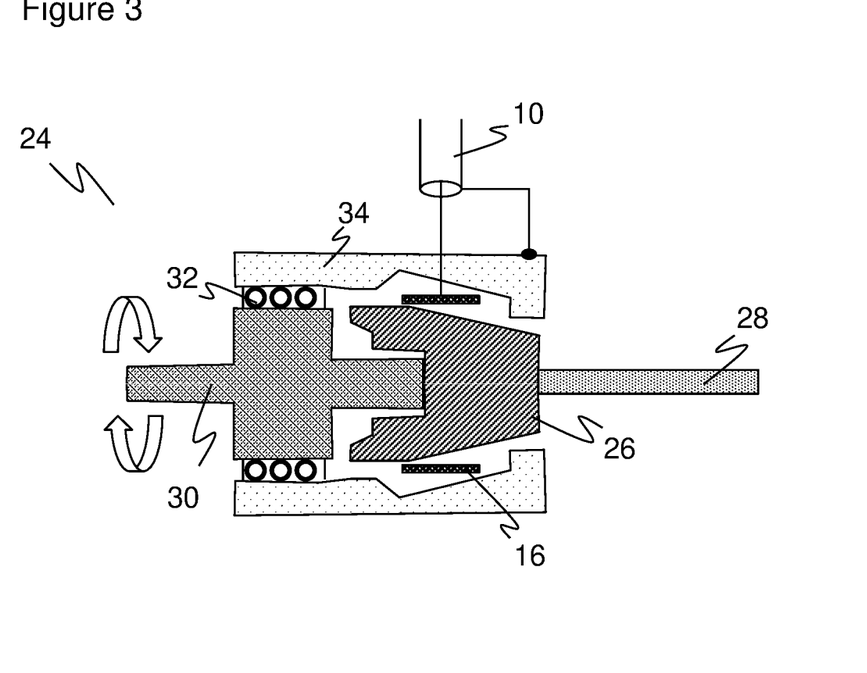
FIG. 3 a sectional representation similar to FIG. 2 with a different tool mount and a different tool.

FIG. 3 shows a sectional representation similar to FIG. 2 with a different tool mount 26 and a different tool 28. It should thereby again be emphasized that the specific embodiment of the machine tool 24, of the tool mount 26 with the tool 28, and of the coupling unit 16 to the sensor 10, is only to be understood by way of example and can be varied. A tapered or chamfered arrangement is specifically selected in FIG. 3 that enables a particularly low reflection coupling of radio frequency signals and facilitates the propagation in the desired direction to the tool 28 and its tip. The invention is, however, generally not restricted either to a specific tool mount 26 that can, for example, be configured as a Morse taper, a short taper, or a hollow shank taper or to specific tools 28 having the most varied lengths, diameters, and boring heads. The tool 28 does not either have be a drill 28 or to have to rotate.

Figure 4:
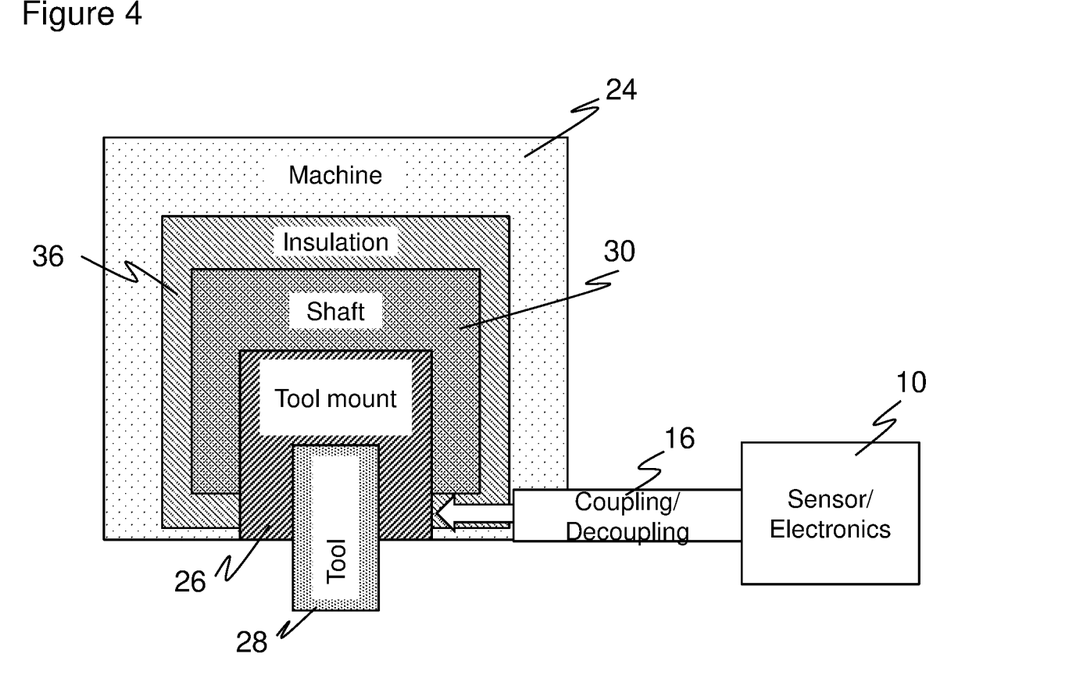
FIG. 4 a schematic representation of the coupling of a sensor for the tool inspection to the tool indirectly via the tool mount.

FIG. 4 shows the machine tool 24 with its shaft 30, tool mount 26 and tool 28, and the coupling via the coupling unit 16 of the sensor 10 again in an abstract form. As already in the previous embodiments, the radio frequency signal is coupled into the tool mount 26. A coupling could equally take place to the shaft or to the moving or rotating part of the machine tool 24 since, as a rule, a metallic and thus conductive connection exists to the tool mount 26.

Now, however, the moving part of the machine tool 24, that is in particular the shaft 30 with the tool mount 26, should preferably be insulated from the remaining machine tool 24 by an insulation 36. The tool mount 26 and the tool 28 then, as desired, form the inner conductor of a coaxial system and the part of the machine separated therefrom by the insulation 36 forms the outer conductor. The time of flight can in this manner be determined with the customary procedure of a TDR measurement process.

Figure 5:
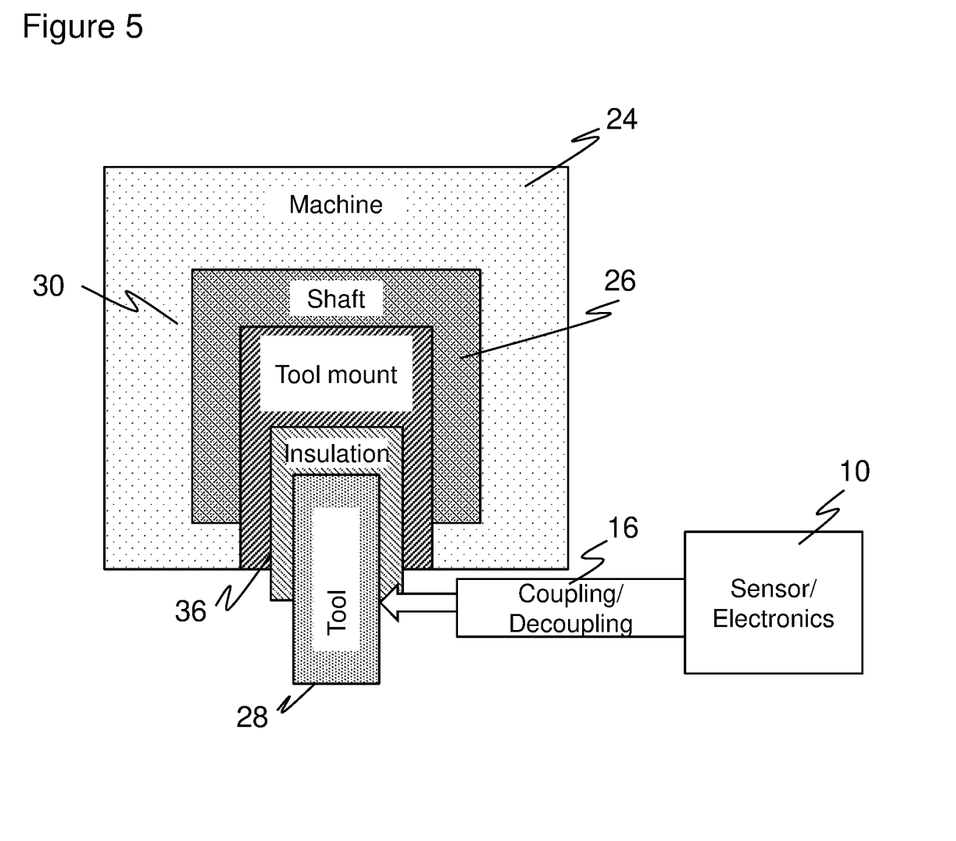
FIG. 5 a schematic representation similar to FIG. 4, but with a coupling directly to the tool.

FIG. 5 shows a further embodiment of the invention in an abstract representation similar to FIG. 4. The coupling here takes place directly on the tool 28 and not indirectly via the tool mount 26. The tool 28 is insulated from the tool mount 26 by an insulation 36. A coaxial system is likewise implemented thereby with the tool 28 as the inner conductor and the tool mount 26 together with the shaft 30 and the surrounding part of the machine as the outer conductor. The complexity of the drivetrain of the machine tool 24 is hereby increased to a certain extent. A retrofittability with the sensor 10 in accordance with the invention for tool inspection is in turn simplified.

The invention claimed is:

1. A sensor for inspecting a tool of a machine tool,
wherein the sensor has a radio frequency transmitter for generating a radio frequency signal, a radio frequency receiver for generating a received signal from a received radio frequency signal, a coupling unit to couple a radio frequency signal into the tool so as to transmit the radio frequency signal to penetrate into the tool or as a radio frequency wave at the surface having a penetration depth that depends on the physical characteristics of the tool, with the radio frequency signal conducted from the sensor into the tool establishing a time domain reflectometry (TDR) signal and reflected at the remote part of the tool and to decouple it from the tool, and a control and evaluation unit to determine a time of flight of a radio frequency signal transmitted from the radio frequency transmitter and received again by the radio frequency receiver with reference to the received signal of the radio frequency receiver,
and wherein the TDR signal from said radio frequency wave establishes a pathway within a portion of the tool subject to inspection.

2. The sensor in accordance with claim 1,
wherein the sensor has an output for outputting length information of the tool acquired from the time of flight and/or a display for displaying length information of the tool acquired from the time of flight.

3. The sensor in accordance with claim 1,
wherein the control and evaluation unit is configured to compare the measured time of flight with an expected time of flight of an expected tool and in particular to output or display a result of the comparison.

4. The sensor in accordance with claim 1,
wherein the tool has a rotating tool.

5. The sensor in accordance with claim 4,
wherein the rotating tool is a drill.

6. The sensor in accordance with claim 1,
wherein the coupling unit has a coupling piece that at least partly surrounds the periphery of the tool and/or of a tool mount of the tool.

7. The sensor in accordance with claim 1,
wherein the coupling unit is configured to couple the radio frequency signal directly into the tool.

8. The sensor in accordance with claim 1,
wherein the coupling unit is configured to couple the radio frequency signal into a tool mount of the tool or into a shaft of the machine tool.

9. The sensor in accordance with claim 1,
wherein the control and evaluation unit is configured to take account of a previously recorded reference signal in the determination of the time of flight.

10. The sensor in accordance with claim 9,
wherein the previously recorded reference signal is a reference signal that was recorded for an expected tool.

11. A machine tool having a tool and having a sensor for inspecting the tool,
wherein the sensor has a radio frequency transmitter for generating a radio frequency signal, a radio frequency receiver for generating a received signal from a received radio frequency signal, a coupling unit to couple a radio frequency signal into the tool so as to transmit the radio frequency signal to penetrate into the tool or as a radio frequency wave at the surface having a penetration depth that depends on the physical characteristics of the tool, with the radio frequency signal conducted from the sensor into the tool establishing a time domain reflectometry (TDR) signal and reflected at the remote part of the tool and to decouple it from the tool, and a control and evaluation unit to determine a time of flight of a radio frequency signal transmitted from the radio frequency transmitter and received again by the radio frequency receiver with reference to the received signal of the radio frequency receiver,
and wherein the TDR signal from said radio frequency wave establishes a pathway within a portion of the tool subject to inspection.

12. The machine tool in accordance with claim 11, comprising:
an insulation between the tool and a tool mount of the tool.

13. The machine tool in accordance with claim 11, comprising:
an insulation about a tool mount of the tool with respect to the remaining machine tool.

14. A method for inspecting a tool of a machine tool,
transmitting a radio frequency signal to penetrate into the tool or as a radio frequency wave at the surface having a penetration depth that depends on the physical characteristics of the tool, with the radio frequency signal conducted from a sensor into the tool establishing a time domain reflectometry (TDR) signal and reflected at the remote part of the tool;
wherein the radio frequency signal is coupled in the tool at a coupling point, and is decoupled from the tool, with the radio frequency signal running between the coupling and the decoupling to a tool tip of the tool and back and the time of flight of the radio frequency signal up to the tool tip being determined,
and wherein the TDR signal from said radio frequency wave establishes a pathway within a portion of the tool subject to inspection.

15. The method in accordance with claim 14,
wherein the sensor for inspecting a tool of a machine tool is used,
and wherein the sensor has a radio frequency transmitter for generating the radio frequency signal, a radio frequency receiver for generating a received signal from a received radio frequency signal, a coupling unit to coupe a radio frequency signal into the tool and to decouple it from the tool, and a control and evaluation unit to determine a time of flight of the radio frequency signal transmitted from the radio frequency transmitter and received again by the radio frequency receiver with reference to the received signal of the radio frequency receiver.

16. The method in accordance with claim 14,
wherein the determination of the time of flight is carried out during the regular work routine of the machine tool.

17. The method in accordance with claim 14,
wherein the determination of the time of flight takes place in specific work phases in which the tool is not in the vicinity of a workpiece and/or in which the tool is in a known environment.

18. The method in accordance with claim 17,
wherein a reference signal for the known environment is recorded in advance and is taken into account in the determination of the time of flight.

19. The method in accordance with claim 14,
wherein the determination of the time of flight takes place in a work phase in which the tool comes into contact with a work means.

20. The method in accordance with claim 19, wherein the determination of the time of flight takes place in a work phase in which the tool is dipped into a work means or is admixed therewith.

\* \* \* \* \*